(12) United States Patent
Viitasalo et al.

(10) Patent No.: US 12,071,005 B2
(45) Date of Patent: Aug. 27, 2024

(54) TRANSMISSION ARRANGEMENT AND METHOD FOR AGRICULTURAL VEHICLE

(71) Applicant: AGCO International GmbH, Neuhausen (CH)

(72) Inventors: Ville Viitasalo, Suolahti (FI); Raine Kivelä, Suolahti (FI)

(73) Assignee: AGCO International GmbH, Neuhausen (CH)

( * ) Notice: Subject to any disclaimer, the term of this patent is extended or adjusted under 35 U.S.C. 154(b) by 137 days.

(21) Appl. No.: 17/757,764

(22) PCT Filed: Dec. 14, 2020

(86) PCT No.: PCT/IB2020/061880
§ 371 (c)(1),
(2) Date: Jun. 20, 2022

(87) PCT Pub. No.: WO2021/124063
PCT Pub. Date: Jun. 24, 2021

(65) Prior Publication Data
US 2023/0339313 A1  Oct. 26, 2023

(30) Foreign Application Priority Data

Dec. 19, 2019  (GB) ..................... 1918820
Dec. 19, 2019  (GB) ..................... 1918821
Dec. 19, 2019  (GB) ..................... 1918823

(51) Int. Cl.
*B60K 17/08* (2006.01)
*B60K 17/02* (2006.01)
(Continued)

(52) U.S. Cl.
CPC .............. *B60K 17/08* (2013.01); *B60K 17/02* (2013.01); *B60K 17/28* (2013.01); *B60K 17/3467* (2013.01)

(58) Field of Classification Search
CPC ........ B60K 17/08; B60K 17/02; B60K 17/28; B60K 17/3467
(Continued)

(56) References Cited

U.S. PATENT DOCUMENTS 9,856,973 B1 * 1/2018 Owen .................. F16H 63/3023
2018/0187760 A1 * 7/2018 Pauli ....................... F16H 3/091
(Continued)

FOREIGN PATENT DOCUMENTS

DE  10 2011 081765 A1  2/2013
GB        2063395 A     6/1981
(Continued)

OTHER PUBLICATIONS

UK Intellectual Property Office, Search report for UK Priority Application No. GB1918823.4, dated Jun. 19, 2020.
(Continued)

*Primary Examiner* — Ha Dinh Ho

(57) ABSTRACT

A tractor transmission including a range gearbox having an input shaft driven from a prime mover through a main clutch, an output shaft, an auxiliary drive shaft driven from the prime mover independently of the input shaft, and a torque fill drive system operative between the auxiliary drive shaft and the range gearbox output shaft including a torque fill clutch operative to transmit torque from the auxiliary drive shaft to the output shaft of the range gearbox when the torque fill clutch is engaged, so that when drive to the input shaft is interrupted to change gear, the torque fill clutch is engaged to transfer drive from the auxiliary drive shaft to the output shaft and maintain momentum of the vehicle. The system may transmit torque to the output shaft through a lay shaft of the range gearbox or through a ground speed PTO drive.

18 Claims, 5 Drawing Sheets

(51) Int. Cl.
*B60K 17/28* (2006.01)
*B60K 17/346* (2006.01)

(58) Field of Classification Search
USPC .................................................. 74/325, 331
See application file for complete search history.

(56) References Cited

U.S. PATENT DOCUMENTS

| | | | | |
|---|---|---|---|---|
| 2019/0289771 A1* | 9/2019 | Lang | ...................... | A01B 71/06 |
| 2020/0393020 A1* | 12/2020 | Bulgrien | ................ | F16H 3/093 |
| 2021/0094416 A1* | 4/2021 | Tsuchida | ............. | F16H 57/0494 |
| 2021/0354556 A1* | 11/2021 | Czernobil | ............ | F16H 37/043 |
| 2022/0153132 A1* | 5/2022 | Sonoda | ................... | B60T 1/062 |
| 2022/0235536 A1* | 7/2022 | Miyazaki | .............. | F16H 61/431 |
| 2023/0193982 A1* | 6/2023 | Stafsholt | ................. | F16H 3/093 |
| | | | | 74/331 |
| 2023/0313865 A1* | 10/2023 | Hedman | ................ | F16H 3/006 |
| | | | | 74/331 |

FOREIGN PATENT DOCUMENTS

| | | |
|---|---|---|
| JP | H06323428 A2 | 11/1994 |
| WO | 89/01100 A1 | 2/1989 |

OTHER PUBLICATIONS

European Patent Office, International Search Report related to International Patent Application No. PCT/IB2020/061880, mail date Feb. 15, 2021.

\* cited by examiner

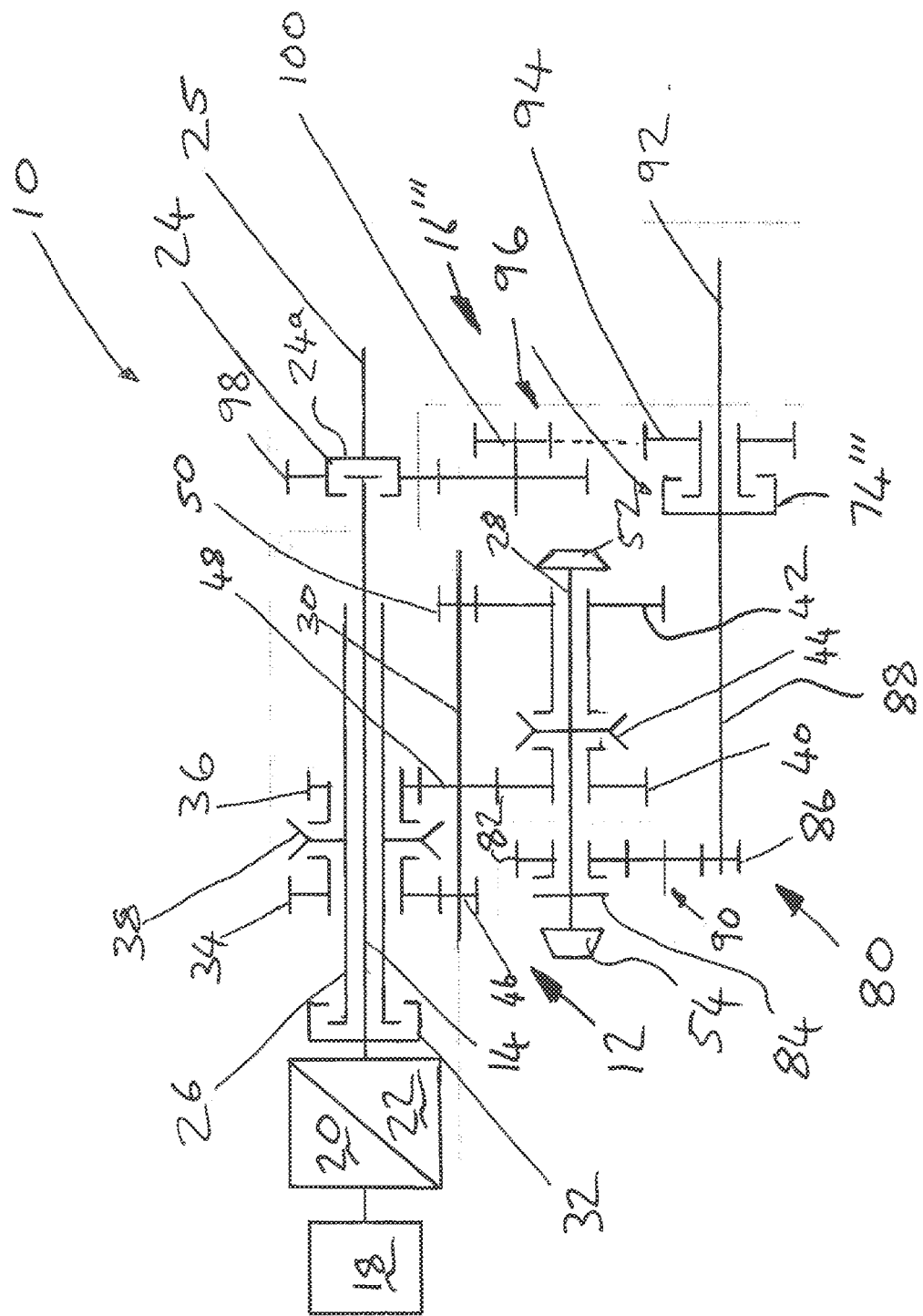

though it is to be understood that the PTO output shaft is proportional to the

TRANSMISSION ARRANGEMENT AND METHOD FOR AGRICULTURAL VEHICLE

FIELD OF THE INVENTION

The present invention relates to a transmission arrangement for an agricultural vehicle. In particular, the invention relates to a transmission arrangement for an agricultural vehicle such as a tractor having different gear ranges.

TECHNICAL BACKGROUND

Tractor transmissions often have a large number of gears and usually have a number of speed gears and a number of gear ranges. For example there may be four speed gears 1, 2, 3 and 4 from slow to fast, and four ranges A, B, C and D from low to high.

The gear ranges are also referred to as Work Areas and assist in optimizing the efficiency of the engine and transmission, allowing a more economical drive. Each Work Area may begin from zero and offer stepless speed adjustment. In one known example, the transmission has four work areas, for example:

Work Area A
  For heavy pulling/special crops
  0-9 km/h
  For the heaviest jobs, like low-speed tillage or special crop harvesting.
  Ideal when high pulling power is needed continuously, or when precise speed adjustments are needed.
  Extremely high pulling power with PTO-driven trailers.
Work Area B
  For field work
  0-18 km/h
  Universal field work range
  Ideal from seeding and faster tillage up to different forage operations.
  Easy control of different operations (like harvesting speeds).
  Also suitable for transporting in the forest.
Work Area C
  For fast working
  0-27 km/h
  Ideal when transporting in field conditions.
  Suitable for many municipality applications.
  Efficient starting with heavy loads.
Work Area D
  For road transport
  0-50 km/h
  Ideal for road transport at high speeds.

In one known arrangement, a range gearbox has an input shaft which is selectively drivable by the prime mover of the vehicle via a clutch arrangement. Two or more input stage gears are rotatably mounted to the input shaft and a first gear selection arrangement is operative to selectively lock any one of the input stage gears to the input shaft to transmit drive between the input shaft and the selected input stage gear. An output shaft is aligned parallel to the input shaft. The output shaft has two or more output stage gears rotatably mounted to the output shaft and a second gear selection arrangement is provided to selectively lock any one of the output stage gears to the output shaft to transmit drive between the selected output stage gear and the output shaft. A lay shaft is arranged between and parallel to the input and output shafts. The lay shaft carries a number of fixed gears which are constantly meshed with the selectable input and output stage gears so that when one each of the input and output stage gears is selected, torque is transmitted from the input shaft to the output shaft via the selected gears and the lay shaft. By selecting different combinations of input stage gears and output stage gears a variety of gear ratios are provided. Typically, the range gearbox shifts the input and output stage gears independently and/or sequentially.

It is also well known to provide a tractor with a power take off (PTO). A tractor may have more than one PTO, for example a front and rear PTO.

The one or more PTO is generally a shaft driven from the tractor's prime mover to transfer mechanical drive to an attached implement, for example a baler rotary harrows, fertilizer spreaders, sprayer pumps. Implement manufacturers now manufacture tractors and implements to run at one of three standard speeds, namely, 540 rpm, 1000 rpm, and ground speed. The term "ground speed" means that the rate of rotation of the PTO output shaft is proportional to the speed at which the tractor travels across the ground. Since implements are manufactured to these standards, it is necessary for tractors to be provided with PTO output shafts which are rotated at the required speed. PTO gear trains have been developed which provide for the selection of different speeds, e.g. 1000 rpm, 540 rpm, ground speed. For ease of reference, a PTO arrangement which is intended to provide an output at one or more set rotational speeds, e.g. 540 rpm, 1000 rpm, will be referred to hereinafter as an "independent" PTO as the speed of the PTO output shaft is independent of the ground speed of the vehicle.

In the case of an independent PTO, the drive for the PTO is often taken from an auxiliary drive shaft driven from the prime mover. In this case, a PTO gearbox is provided which will produced the desired output speed of the PTO output shaft at a given engine speed. The gearbox may include a speed change gearbox so that different PTO output shaft speeds can be selected by the user. The chosen engine speed is selected by the vehicle manufacturer and is usually a speed towards the maximum engine speed, thereby permitting engine speed to fall as load on the PTO output shaft increases. Where the load on the PTO output shaft is relatively low, the torque back up provided by running the engine at a high speed is not required. It is therefore not efficient to run the engine at high speed. In order to overcome this problem, tractor manufacturers often provide what is known as an economy PTO drive mode in which the gear train is arranged to drive the PTO output shaft at the desired speed at an engine speed of about two thirds maximum speed. This improves fuel economy and the engine runs more quietly at slower speeds.

In order to provide a ground speed PTO, drive for the PTO output shaft may be taken from part of the vehicle transmission which rotates at a speed proportional to the ground speed of the vehicle. In some known arrangements, drive for a ground speed PTO is taken from the output shaft of the range gearbox.

Where both an independent PTO and a ground speed PTO option is provided, these may be delivered through a common PTO output shaft using clutch arrangements to selectively engage an independent, fixed speed drive from the auxiliary shaft or a ground speed drive taken from the output shaft of the range gearbox.

Modern tractors may also be provided with a power shuttle gearbox to allow for easy switching between forward and reverse travel and a power shift transmission (PS) or a continuously variable transmission or (CV) transmission as discussed in more detail below. Where provided, these are typically located in the drivetrain between the prime mover and the range gearbox and include clutch arrangements which are operative to selectively transmit drive to the input shaft of the range gearbox.

Tractors are often used in applications where frequent changes between forward and reverse gears are required, for example loading work or cultivation work. To avoid repeated de-clutching, the power shuttle gearbox was developed. The power shuttle gearbox allows the driver of a vehicle to change the direction of travel from forward to reverse or vice versa simply by pressing a button or pulling a lever. This eliminates the need for the driver to use the clutch pedal to initiate a change of direction gear change. Some power shuttle gearboxes also allow gearshifts from neutral to a forward gear, or neutral to a reverse gear to be executed.

One type of power shuttle gearbox requires hydraulic actuation of a clutch. The performance of such a power shuttle gearbox is influenced by the time taken for the hydraulic actuator to move the clutch pack from its biting point to its fully engaged position. This is known as clutch take up. Changing the duration of this period changes the aggressiveness of clutch take up, and therefore the aggressiveness with which drive is taken up.

The provision of a power shuttle gearbox means that the transmission can provide the same number of forward gears as there are reverse gears. For a 4 speed 4 range transmission with power shuttle, this would be described as having a "16×16" transmission. Alternatively, a tractor may have a four range transmission with six speed gears, therefore having twenty four speeds, including power shuttle would give twenty four forward gears and twenty four rear gears or a "24×24" transmission.

In addition, modern tractors are usually provided with either a power shift transmission (PS) transmission or a continuously variable transmission or (CV) transmission.

A CV transmission may use belts to transfer power from the tractor engine to the driving wheels, or other ground engaging driving means such as tracks, using an essentially infinite number of speeds.

For simplicity, reference will be made herein to "wheels" or "driving wheels". However, it should be understood that these terms are intended to also cover other ground engaging means which can be used to drive a vehicle across the ground, such as ground engaging tracks, unless the context requires otherwise.

A PS transmission operates within a given range of a transmission and permits shifting under load. Generally with a PS transmission an operator selects an engine speed and an appropriate gear for a specific task, and then when the load increases the engine speed drops and the operator can change to a more appropriate gear.

PS transmissions reduce the torque interruption during the shifting procedure to a minimal duration, but, nevertheless during the shifting procedure/gear change there is necessarily a brief interruption in drive to the wheels due to the disengaging of one gear and the engagement of the next gear.

When there is significant load on a vehicle transmission, interruption of torque delivery to the driving wheels may cause undesirable/uncomfortable operating conditions, such as jerky/stuttering/interrupted vehicle motion. This undesirable operating condition is particularly pronounced and problematic when there is a significant drag load on a vehicle. For instance, when a tractor is pulling a plough, engagement of the plough with the ground effectively acts as an anchor to slow progress of the vehicle. When drive is temporarily interrupted during the gear shifting process, the vehicle tends slow very quickly. However, the drag load is quickly overcome when the gear change is complete and drive is reinstated. This causes an undesirable staccato operating and driving nature and may put undue and excessive wear on transmission and driveline components which may lead to component fatigue and early failure. Other implements often used with a tractor can cause a similar drag load as can towing a heavy trailer, especially uphill.

A PS transmission may enable gear shifting under load, while reducing interruption in the torque transmitted between the engine and driving wheels. This is usually achieved by employing selectively engageable clutch means for each gear, or a pair of clutches for two drive shafts connected to respective sets of gears, and further clutch means for connecting said gears to an output shaft. However, generally there is still a period where torque transmitted between the engine and wheels is briefly interrupted. The interruption of drive to the wheels is a particular issue when changing range gear.

It is an object of the present invention to provide a vehicle transmission which overcomes, or at least mitigates, the problems of the known vehicle transmissions. In particular, it is an objective of the present invention to provide a transmission where interruption of drive or power flow to the driving wheels during changes in range gear is reduced.

It is also an object of the invention to provide a method of operating such a vehicle transmission in order to overcome, or at least mitigate, the problems of the known vehicle transmissions.

SUMMARY OF THE INVENTION

In accordance with an aspect of the invention, there is provided a transmission arrangement for an agricultural vehicle, the transmission arrangement comprising a range gearbox having an input shaft driveably connectable to a prime mover of a vehicle in which the transmission is mounted and an output shaft driveably connected to the input shaft to provide a number of drive ratios and operable in use to provide drive to at least one ground engaging member of the vehicle, the transmission also comprising an auxiliary drive shaft driveably connectable to the prime mover independently of the range gearbox input shaft, wherein the transmission comprises a torque fill drive system operative between the auxiliary drive shaft and the range gearbox output shaft, the torque fill drive system comprising a torque fill clutch and configured, in use, to transmit torque from the auxiliary drive shaft to the output shaft of the range gearbox when the torque fill clutch is engaged.

Advantageously in a transmission in accordance with this aspect of the invention, the torque fill clutch can be engaged to transfer torque from the auxiliary shaft to the range gearbox output shaft to prevent, or at least reduce, the interruption of driving torque to the driving wheels when the range gearbox is shifting between gears.

In an embodiment, the range gearbox comprises a plurality of input stage gears rotatably mounted to the input shaft and a first gear selection arrangement for selectively locking any one of the input stage gears to the input shaft to transmit drive between the input shaft and the selected input stage gear, a plurality of output stage gears rotatably mounted to the output shaft and a second gear selection arrangement for selectively locking any one of the output stage gears to the output shaft to transmit drive between the selected output stage gear and the output shaft, a lay shaft having a plurality of gears for transferring torque between the input and output stage gears, wherein the torque fill drive system is configured to transmit torque to the range gearbox output shaft through the range gearbox lay shaft.

In an embodiment, the input, output and lay shafts in the range gearbox are aligned parallel to one another and the torque fill drive system comprises a torque fill drive shaft aligned parallel to the range gearbox shafts, the torque fill drive system comprising a torque fill shaft input drive arrangement for transmitting drive from the auxiliary shaft to the torque fill shaft and a torque fill shaft output drive arrangement for transmitting drive from the torque fill shaft to the range gearbox lay shaft, the torque fill clutch forming part of the torque fill shaft input drive arrangement or the torque fill drive output arrangement.

In an embodiment, the range gearbox input shaft is hollow and the auxiliary drive shaft passes through the range gear input shaft, the auxiliary drive shaft exiting the range gearbox input shaft at a first side of the range gearbox, the torque fill shaft input drive arrangement being located at said first side of the range gearbox for cooperation with the auxiliary drive shaft. In which case, the torque fill shaft output drive arrangement may be located at the opposite side of the input stage gears from the torque fill shaft input drive arrangement. The torque fill shaft output drive arrangement may comprise a series of meshing gears including at least a first gear mounted about the torque fill drive shaft and a second gear fixed for rotation with the lay shaft, the torque fill clutch being operative to selectively couple and decouple the first gear and the torque fill drive shaft. In a different embodiment, the torque fill clutch forms part of the torque fill shaft input drive arrangement. In this embodiment, the torque fill shaft input drive arrangement may comprise a series of meshing gears including at least a first gear fixed for rotation with the auxiliary shaft and a further gear, wherein the torque fill clutch is operative to selectively couple and decouple the further gear and the torque fill drive shaft. The torque fill shaft output drive arrangement may comprise a gear fixed for rotation with the torque fill drive shaft, said gear being in constant meshing engagement with one of the input stage gears of the range gearbox, and wherein said one of the input stage gears is in constant meshing engagement with a gear fixed for rotation with the range gearbox lay shaft.

Where the torque fill drive system is configured to transmit torque to the range gearbox output shaft through a range gearbox lay shaft, the torque fill drive system may comprise a series of meshing gears, a first of said meshing gears being fixed for rotation with the auxiliary drive shaft, said torque fill clutch being operative to selectively couple and decouple a final gear in the series and the range gearbox lay shaft.

In an embodiment, the transmission includes a ground speed PTO transmission shaft drivingly engageable with the range gearbox output shaft through a ground speed PTO clutch, the torque fill drive system being operative to transmit torque from the auxiliary shaft to the range gear box output shaft through the ground speed PTO transmission shaft and the ground speed PTO clutch. In this embodiment, the torque fill system may comprise a gear train for transmitting drive between the auxiliary drive shaft and the ground speed PTO transmission shaft, the torque fill clutch being operative to selectively couple and decouple a final gear of the gear train and the ground speed PTO transmission shaft. The torque fill drive system may also have a further clutch operative to driving couple a first gear in the gear train to the auxiliary drive shaft. The further clutch may be an independent PTO clutch.

The transmission may further comprise a PS transmission and/or a shuttle gearbox upstream of the range gearbox.

In accordance with a further aspect of the invention, there is provided an agricultural vehicle comprising a transmission arrangement as set out above. The vehicle may comprise a prime mover operably connected to the range gear input shaft and the auxiliary drive shaft. The vehicle may be an agricultural tractor.

In accordance with a still further aspect of the invention, there is provided a method of operating an agricultural vehicle according to the previously defined aspect, the method comprising engaging the torque fill clutch to transfer torque from the auxiliary shaft to the range gearbox output shaft during a change in range gear.

The method may comprise disengaging the torque fill clutch once the gear change is complete.

Where toque is transmitted from the auxiliary shaft to the output shaft of the range gearbox through a lay shaft of the range gearbox, the step of engaging the torque fill clutch to transfer torque from the auxiliary shaft to the range gearbox output shaft may only be carried during a change of input stage range gear.

In accordance with a yet further aspect of the invention, there is provided the method of operating an agricultural vehicle according as defined above, the method comprising:
  interrupting drive to the range gearbox shaft input shaft while maintaining drive to the auxiliary drive shaft;
  shifting between range gears while drive to the input shaft is interrupted; re-engaging drive to the input shaft once the gear change is complete;
  engaging the torque fill clutch to transfer torque from the auxiliary shaft to the range gearbox output shaft at least during part of the time while drive to the input shaft is interrupted.

The method may comprise engaging the torque fill clutch in step d) just after, just before or at the same time as drive from prime mover to the range gearbox is interrupted.

BRIEF DESCRIPTION OF THE DRAWINGS

Embodiments of the invention will now be described, by way of example only, with reference to the accompanying drawing, in which:

FIG. 5 is a schematic representation of a fourth embodiment of a transmission arrangement according to an aspect of the invention for use in the tractor of FIG. 1.

The drawings are provided by way of reference only, and will be acknowledged as not to scale.

DETAILED DESCRIPTION

Figure 1:
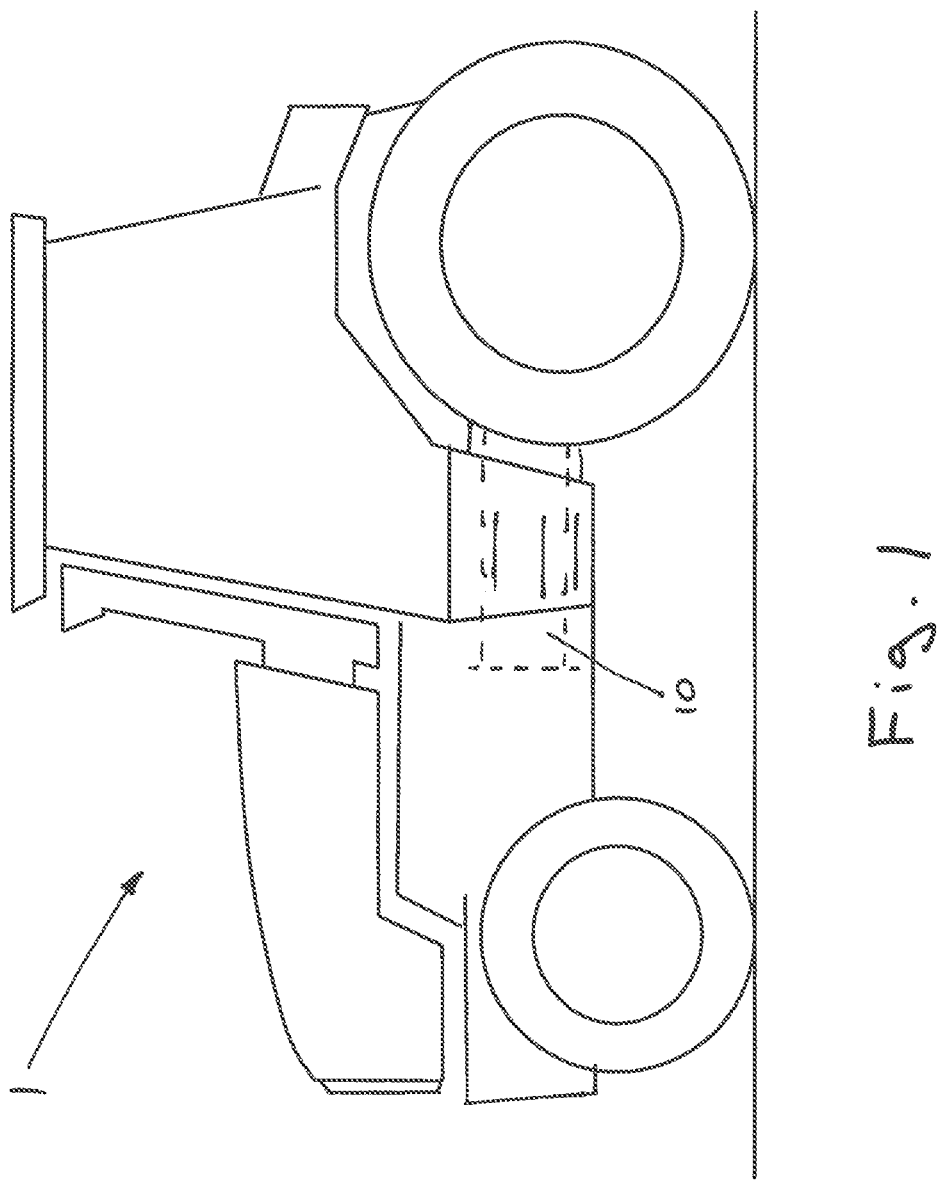
FIG. 1 is a schematic illustration of a tractor including a transmission arrangement according to an aspect of the invention.

FIG. 1 shows a tractor 1 including a transmission arrangement 10 in accordance with the invention, exemplary embodiments of which are shown in more detail in FIGS. 2 to 5. The transmission arrangement 10 may be housed in a common housing, or multiple housings attached to one another to form a singular common housing which is not shown. The common housing is suitable for attachment to a vehicle axle (especially a rear axle) and may form part of the chassis or be structurally load bearing in the case of a tractor transaxle.

Figure 2:
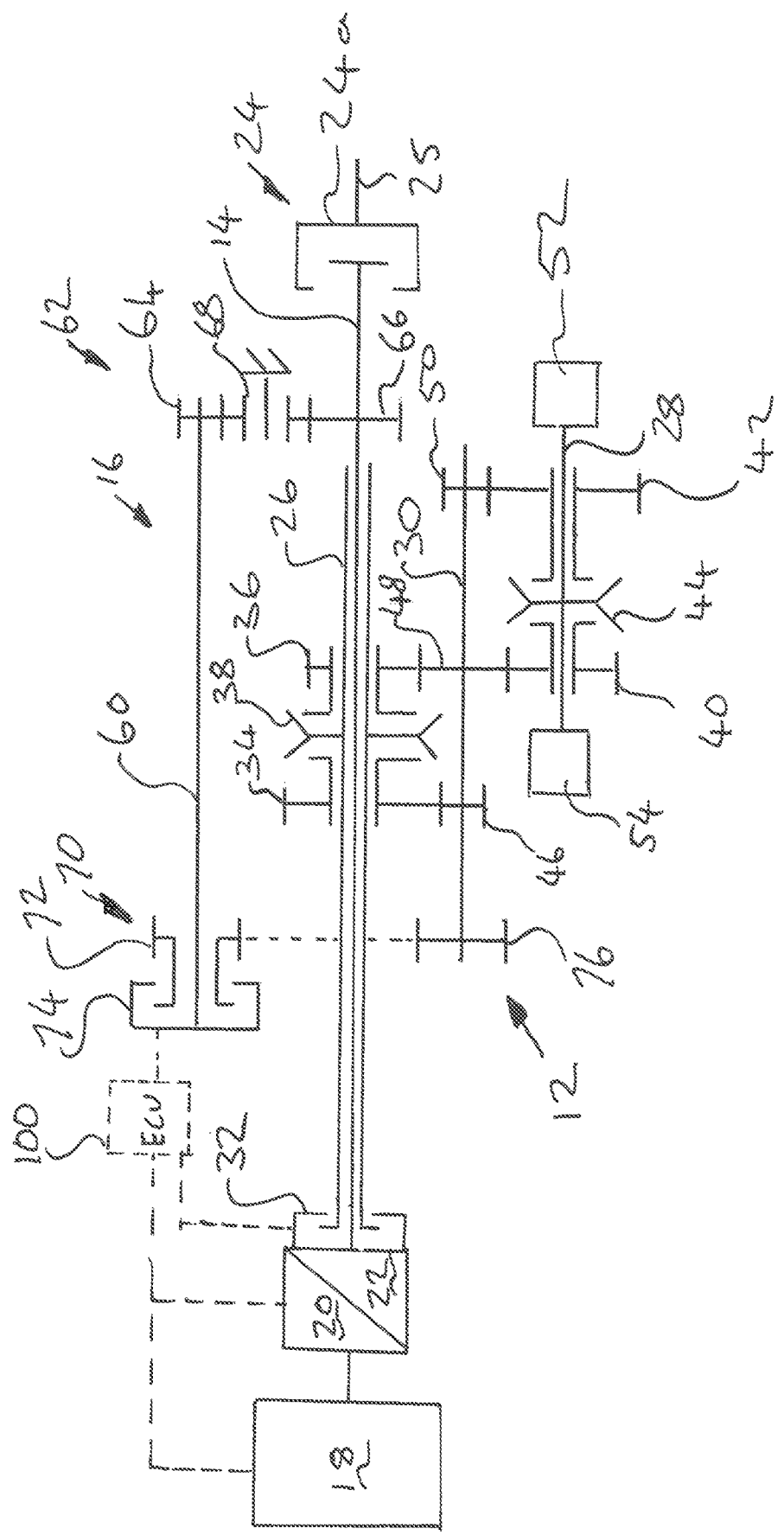
FIG. 2 is a schematic representation of a first embodiment of a transmission arrangement according to an aspect of the invention for use in the tractor of FIG. 1.

With reference to FIG. 2, an exemplary schematic of a transmission arrangement 10 according to a first embodiment of the present invention is shown.

The transmission arrangement includes a range gearbox (indicated generally at 12), an auxiliary drive shaft 14, and a torque fill drive system (indicated generally at 16) which is selectively operable to transmit torque from the auxiliary drive shaft to a lay shaft of the range gearbox as will be described in more detail below.

It will be understood that the term "range gearbox" refers to a functional unit of the transmission for providing a number of selectable gear ratios. The term does not imply that the unit is in a separate housing or box from other functional units in the transmission which, as noted above, may be accommodated in a common housing.

FIG. 2 also shows a prime mover 18 of the vehicle, a power shuttle unit 20 and a PS unit 22 which optionally may form a part of a transmission in accordance with the invention.

The prime mover 18 is responsible for power generation for the vehicle and may for example comprise an internal combustion engine such a diesel engine or an electric generator powering a motor thereby providing electric drive, or indeed the prime mover 26 may be a hybrid drive system, for instance a diesel electric setup.

The prime mover may be of any suitable design and/or capacity to drive the transmission arrangement 10 and ultimately provide power to the driving wheels and any other system on the vehicle such as a PTO.

The power shuttle unit 20 and PS unit 22 may also be of any suitable types and so are not shown in detail. Indeed, the power shuttle unit 20 and/or the PS unit 22 may be omitted or replaced by other functionally equivalent units. For example, the PS unit may be replaced by a CV transmission.

The auxiliary drive shaft 14 is driven by the prime mover and is used to provide drive for auxiliary systems of the vehicle such as a hydraulic system of the vehicle and or a PTO. These auxiliary systems do not form part of the present invention and so are not described in detail. However, a PTO clutch for selectively coupling the auxiliary drive shaft 14 to an independent PTO gear train is illustrated at 24. An independent PTO transmission shaft 25 is illustrated schematically associated with an output or downstream part 24a of the independent PTO clutch 24. When the independent PTO clutch is engaged, drive is transmitted from the auxiliary drive shaft 14 to the independent PTO transmission shaft 25 from where it passes through an independent PTO gearbox (not shown) to a PTO output shaft (also not shown). Typically, the auxiliary shaft is driven at all times the prime mover is running and is rotated in a constant direction, which may correspond to that of the output shaft of the prime mover, e.g. clockwise.

The range gearbox 12 includes an input shaft 26, an output shaft 28 and a lay shaft 30. All three shafts are aligned with their axes parallel to one another and the auxiliary drive shaft 14.

The input shaft 26 is drivingly coupled with the prime mover through the power shuttle 20 and PS unit 22 which include clutch arrangements for selectively transmitting drive to the range gearbox input shaft 26. The clutch arrangements will typically include a forward clutch in the power shuttle unit 20 which is illustrated schematically at 32 and for simplicity will be referred to as a main clutch. However, it should be understood that reference to a main clutch herein, including the claims, is intended to cover any suitable clutch which is operative to engage and disengage drive from the prime mover to the input shaft 26.

In this embodiment, the input shaft 14 is a hollow shaft mounted concentrically about the auxiliary drive shaft but this is not essential.

A first input stage gear 34 and a second input stage gear 36 are each mounted about the input shaft. A first gear selection system includes a synchronizer 38 which is operative to selectively lock one or other of the input stage gears 34, 36 for rotation with the input shaft. When an input stage gear 34, 36 is rotatably locked to the input shaft 14 by the synchronizer (that is to say the gear is selected) torque can be transmitted from the input shaft 14 to the selected input stage gear. When an input stage gear 34, 36 is not selected, it is free to rotate about the input shaft so that torque is not transmitted between the two.

Similarly, a first output stage gear 40 and a second output stage gear 42 are each mounted about the output shaft 28. A second gear selection system includes a further synchronizer 44 which is operative to selectively lock one or other of the output stage gears 40, 44 for rotation with the output shaft. When an output stage gear 40, 42 is rotatably locked to the output shaft 14 by the further synchronizer 44 (that is to say the gear is selected) torque can be transmitted from the selected output stage gear to the output shaft 28. When an output stage gear 40, 42 is not selected, it is free to rotate about the output shaft 28 so that torque is not transmitted between the two.

The lay shaft 30 has a number of gears wheels permanently fixed for rotation with the shaft. These include:
  a first lay shaft gear 46 which is in constant meshing engagement with a first of the input stage gears 34;
  a second lay shaft gear 48 which is in constant meshing engagement with a second of the input stage gears 36 and with a first of the output stage gears 40; and
  a third lay shaft gear 50 which is in constant meshing engagement with a second of the output stage gears 42.

The lay shaft 30 and lay shaft gears 46, 48, 50 are operative to transmit drive between whichever of the input stage gears 34, 36 is selected and whichever of the output stage gears 40, 42 is selected to form a drive path from the input shaft to the output shaft. Accordingly, in use when one of the input stage gears 34, 36 is selected and one of the output stage gears 40, 42 is selected and the main clutch 32 engaged to so that the input shaft 26 is being driven, drive/torque will be transmitted through the selected input stage gear 34, 36, the lay shaft 30, and the selected output stage gear 40, 42 to the output shaft 28. The output shaft 28 is drivingly connected with a rear axle (as indicated schematically at 52) to drive the rear wheels and, optionally, with a front axle of the vehicle (as indicated schematically at 54) to drive the front wheels. By selecting different combinations of the input and output stage gears, four different gear ratios are provided. In the present embodiment, the range gear box provides four ranges, A, B, C and D. Range A is provided by selecting the second input stage gear 36 and the second output stage gear 42, range B is provided by selecting the first input stage gear 34 and the second output stage gear 42, range C is provided by selecting the second input stage gear 36 and the first output stage gear 40 and range D is provided by selecting the first input stage gear 34 and the first output stage gear 40.

In order to shift or change range gear, the main clutch 32 is disengaged so that drive to the input shaft 14 is interrupted so that the gear change synchronizers 38, 44 can then be actuated. When shifting between ranges A and B and between ranges C and D, only the first gear selection system comprising input stage synchronizer 38 needs to be actuated. When shifting between ranges B and C, both of the gear selection systems comprising input stage synchronizer 38 and output stage synchronizer 44 are actuated. In this case, the two synchronizers will usually be actuated in sequence.

When drive to the input shaft 14 is interrupted in order to shift the range gear, drive to the driving wheels will also be interrupted as discussed above. To reduce this effect, the torque fill drive system 16 is operative to transfer torque from the auxiliary drive shaft 14 to the range gearbox output shaft 28 when drive to the range gearbox input shaft is interrupted during a change of gear. In this embodiment, the torque fill drive system transmits drive to the range gearbox output shaft 28 through the range gearbox lay shaft 30.

The torque fill drive system 16 includes a torque fill shaft 60 aligned parallel to the auxiliary drive shaft 14 and the range gearbox input shaft 26. A torque fill shaft input drive arrangement 62 takes the form of a gear train including a first gear 64 rotationally fast with the torque fill drive shaft 60, a further gear 66 rotationally fast with the auxiliary drive shaft 14 and a lay gear 68 between the first gear 64 and the further gear 66 and arranged so that the torque fill drive shaft is driven to rotate whenever the auxiliary drive shaft is driven by the prime mover 18. It will be appreciated that other arrangements for transferring drive from the auxiliary drive shaft 14 to the torque full drive shaft 62 can be adopted. For example, rather than using meshing gears, a system of drive belts or chains may be used.

The torque fill shaft input drive arrangement 62 is located on the distal side of the range gearbox 12 from the prime mover 18 at one end of the torque fill shaft. At the opposite end of the torque fill shaft, which is located at the side of the range gearbox closest to the prime mover 18, is a torque fill shaft output drive arrangement 70 for transferring drive from the torque fill shaft 60 to the lay shaft 30 of the range gearbox 12. The torque fill shaft output drive arrangement includes a first torque fill shaft output gear 72 mounted about the torque fill shaft 60 and a torque fill clutch 74 for selectively locking the first torque fill shaft output gear to the torque fill shaft 60 when engaged. The first torque fill shaft output gear 72 is drivingly coupled with a torque fill lay shaft gear 76 rotationally fast with the range gearbox lay shaft 30. The arrangement is configured such that when the torque fill clutch 74 is engaged, torque can be transferred from the auxiliary drive shaft 14 through the torque fill shaft input drive arrangement 62 to the torque fill shaft 60, through the torque fill clutch 74 to the first torque fill shaft output gear 72 and the torque fill lay shaft gear 76 to drive the lay shaft 30. Provided one of the output stage gears 40, 44 in the range gearbox 12 is selected, drive will then be transferred from the lay shaft 30 to the output shaft 28 of the range gearbox and hence to the driving wheels.

In normal use when the vehicle is travelling, the torque fill clutch 74 is disengaged and drive is transmitted through the range gearbox from the input shaft 26 to the output shaft 28 in the usual way. When a change of the input stage range gear 34, 36 is required, drive to the input shaft 26 of the range gearbox is interrupted, for example by disengaging the main clutch 32. However, drive to the auxiliary drive shaft is maintained and by engaging the torque fill clutch 74, drive/torque is transferred from the auxiliary drive shaft 14 to the lay shaft 30 of the range gearbox and hence to the output shaft 28 and the driving wheels to maintain the momentum of the vehicle. Once the gear change has been completed, the main clutch 32 is re-engaged and the torque fill clutch 74 disengaged. This reduces the effect of torque interruption during the shifting procedure, providing a smoother driving experience.

While the torque fill system 16 is only operable when shifting the input stage gears, e.g. when shifting between ranges A and B and between ranges C and D, these changes often give rise to the most significant effects if torque is interrupted. For example, a shift between range A and B will usually occur during field work when the vehicle may be subject to a high drag load caused by an implement being towed by the vehicle. On the other hand, shifting between ranges C and D will usually occur when the vehicle is travelling on a road and may be towing a heavy trailer or implement uphill, giving rise to a high drag load.

As the torque fill drive system 16 has a fixed gear ratio, it can only be used when the vehicle is in forward gear and the gear train is configured to rotate the range gearbox lay shaft 30 in the appropriate direction for forward drive, which in this case is anti-clockwise. Furthermore, the gear ratio of the torque fill drive system 16 is selected to provide a smooth transition when shifting between ranges A and B and between ranges C and D. Accordingly, the gear ratio of the torque fill drive system 16 may be selected so that it matches, or fits between, the gear ratio at the top of the A range and the bottom of the B range and the top of the C range and the bottom of the B range.

Actuation of the main clutch 32 and the torque fill clutch 74 may be simultaneous or sequential and/or may overlap. If actuation is sequential, with the torque fill clutch may be engaged just before or just after drive to the input shaft is interrupted and the torque fill clutch 74 disengaged just before or just after drive to the input shaft is reinstated to minimise torque interruption to the driving wheels.

The torque filling system 16 can be best utilized in transport or road mode when shifting between ranges C and D to provide uninterrupted torque and power to the wheels from 5 kph up to max driving speed. Heavy trailers and hilly conditions may require such high torque that range gear shifting is necessary. During shifting the input stage range gears with a conventional transmission traction can be lost and vehicle speed may dramatically drop or vehicle can even stop when travelling uphill. With the help of torque filling system 16, range gear shifting can be made in the background while keeping motive force to the wheels. The torque fill system can also be useful in field mode when shifting between ranges A and B.

Figure 3:
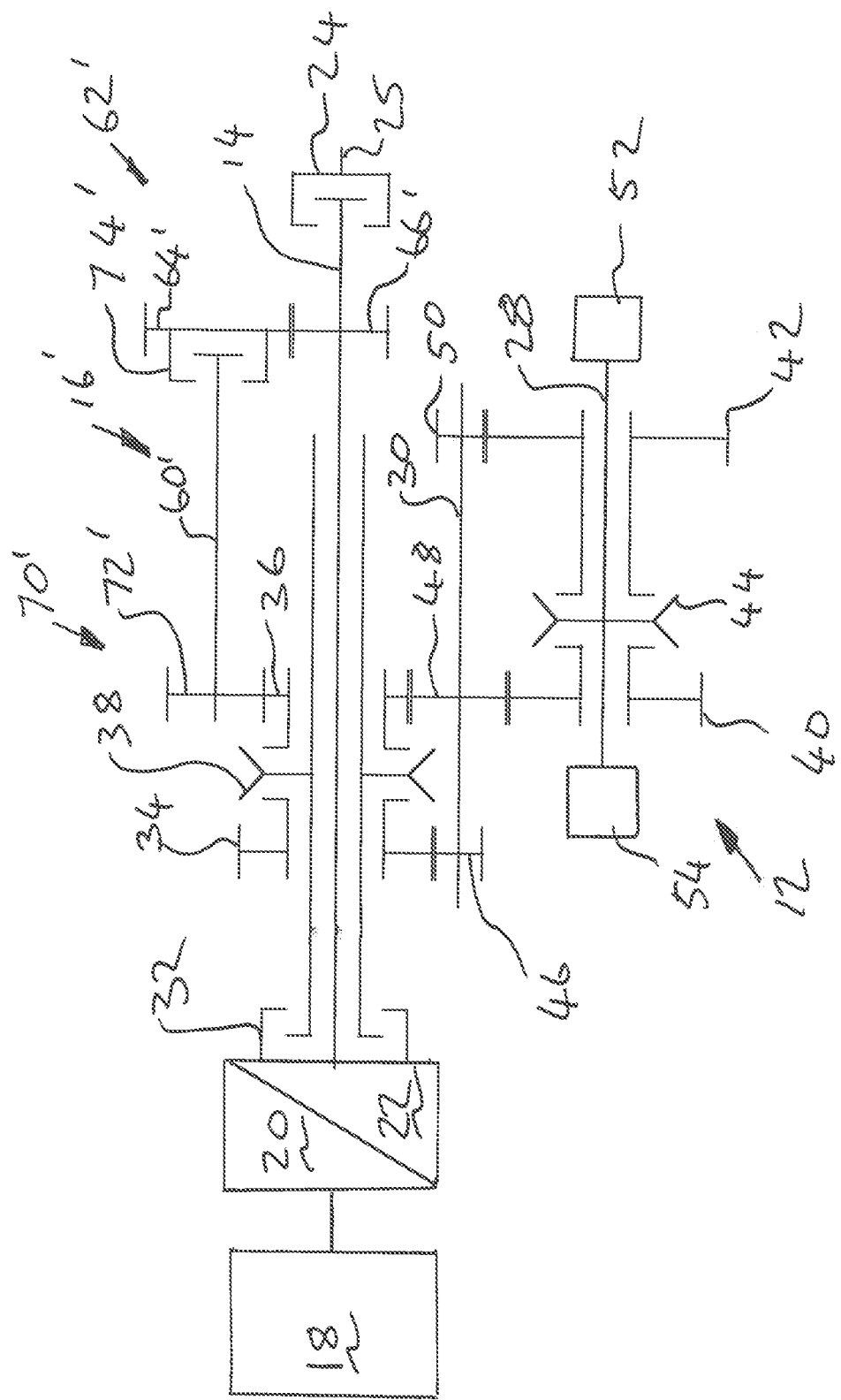
FIG. 3 is a schematic representation of a second embodiment of a transmission arrangement according to an aspect of the invention for use in the tractor of FIG. 1.
Figure 4:
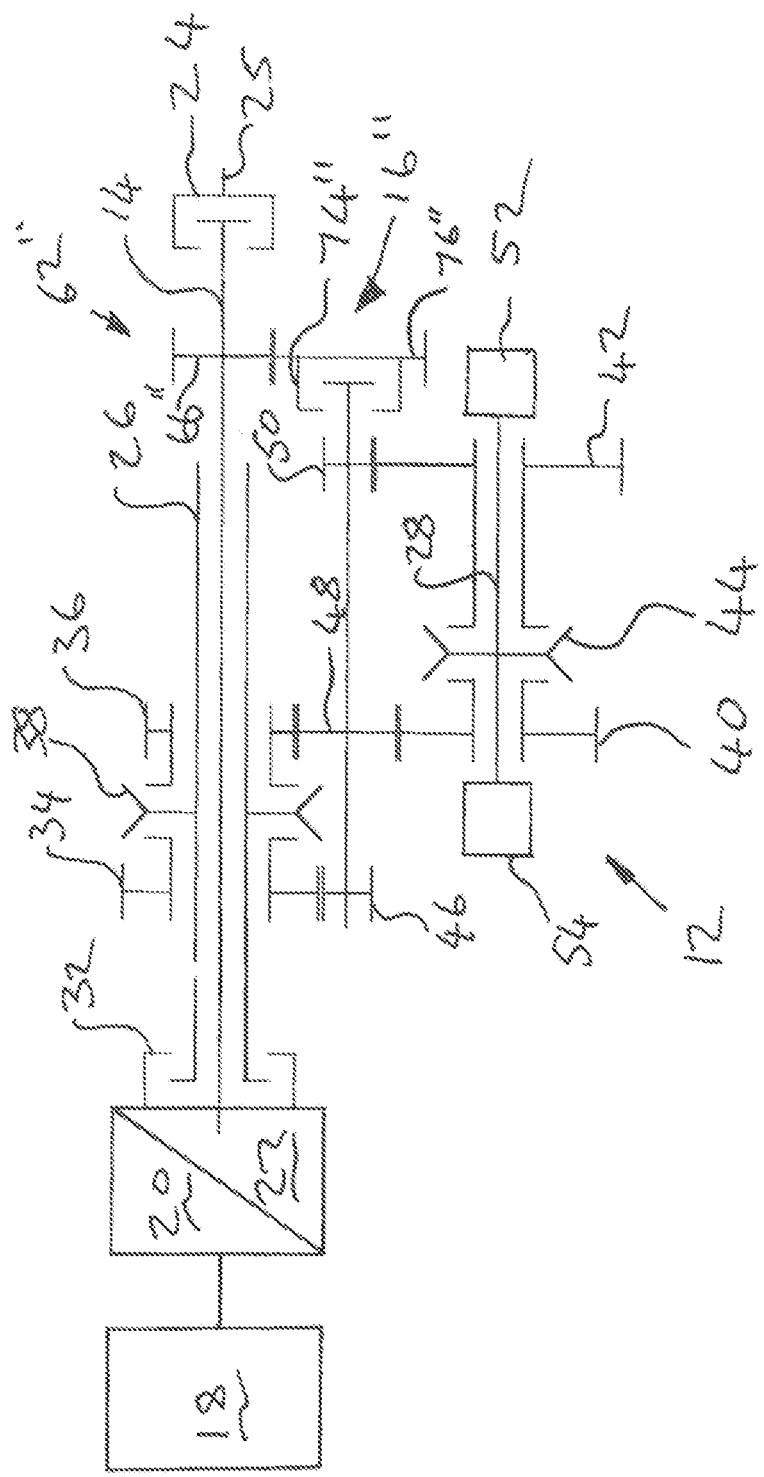
FIG. 4 is a schematic representation of a third embodiment of a transmission arrangement according to an aspect of the invention for use in the tractor of FIG. 1.

FIGS. 3 and 4 illustrate alternative embodiments of a vehicle transmission in accordance with the invention where the torque fill drive system 16 is operative through the lay shaft 30 of the range gearbox 12. The same reference numerals are used to denote features which are the same as in the previous embodiment or which perform the same function. The majority of the transmission in these embodiments is the same as that of the first embodiment and so will not be described in detail. The only differences are in the layout of the torque fill drive system 16', 16".

In the embodiment illustrated in FIG. 3, the torque fill clutch 74' forms part of the torque fill shaft input drive arrangement 62' and so is located at the input end of the torque fill shaft 60', which is farthest away from the prime mover. The torque fill shaft input drive arrangement 62' includes a first gear 64' rotationally coupled with an input or upstream part of the torque fill clutch 74' (in this case the clutch cover) and a second gear 66' rotational fast with the auxiliary drive shaft. The first and second gears are meshing and the torque fill clutch 74' is operative to lock the first gear rotationally fast with the torque fill shaft 60' when engaged. Accordingly, drive is transmitted from the auxiliary drive shaft 14 to the torque fill drive shaft 60' when the torque fill clutch 74' is engaged. Again, it will be appreciated that other arrangements for transferring drive from the auxiliary drive shaft 14 to the torque fill drive shaft 60' can be adopted such as a system of drive belts and/or drive chains. Alternative clutching arrangements can also be adopted.

A torque fill shaft output gear 72' rotationally fast with the torque fill shaft 62' is located at the other end of the shaft. The torque fill shaft output gear 72' is in constant meshing engagement with a second of the input stage range gears 36, which is itself in constant meshing engagement with a fixed gear 48 on the range gearbox lay shaft 30. Accordingly, when the torque fill clutch 74' is engaged, drive is transmitted from the auxiliary drive shaft 14 to the torque fill shaft 60' via the torque fill clutch 74' and on to the range gearbox lay shaft 30 via the output gear 72', the second input stage range gear 36 and the corresponding lay shaft gear 48. This embodiment uses fewer additional components to form the torque fill shaft output drive arrangement 70'.

The torque fill drive system 16' as illustrated in FIG. 3 can be used in the same way as the previous embodiment to temporarily transmit drive from the auxiliary drive shaft 14 to the driving wheels when the input stage range gears are shifting by engaging the torque fill clutch 74'.

FIG. 4 illustrates a still further layout of the torque fill drive system 16". In this embodiment there is no torque fill drive shaft. Rather, drive is transmitted from the auxiliary drive shaft to the range gearbox lay shaft 30 by means of a first torque fill gear 66" rotationally fast with the auxiliary drive shaft 14, a second torque fill gear 76" meshing with the first gear 66", and a torque fill clutch 74" which is operative to transfer torque from the second gear 76" directly to the range gearbox lay shaft 30 when engaged. Again, it will be appreciated that other arrangements for transferring drive from the auxiliary drive shaft 14 lay shaft 30 can be adopted.

The torque fill drive system 16" in this embodiment can be used in the same way as the previous embodiments to temporarily transmit drive/torque from the auxiliary drive shaft 14 to the driving wheels when the input stage range gears are shifting by engaging the torque fill clutch 74".

It can be seen from the various embodiments described above that the layout of the torque fill drive system 16, 16', 16" can be modified in various ways to selectively transmit drive from the auxiliary drive shaft 14 to the lay shaft 30 in the range gearbox depending on layout requirements. It will be noted that since the range gearbox lay shaft 30 rotates in the opposite direction to the auxiliary shaft 14 during forward travel, the torque fill drive systems 16, 16', 16" described above are configured to reverse the direction of drive between the auxiliary drive shaft 14 and the lay shaft 30, for example by the use of a lay gear 68 in the torque fill shaft input drive arrangement as shown in FIG. 2.

In the embodiments described so far where drive from the auxiliary shaft to the output shaft of the range gearbox is routed through the range gearbox lay shaft, the torque fill system can only be engaged when shifting the input stage gears. FIG. 5 illustrates a further example of a transmission in accordance with the invention in which the torque fill drive system 16''' can be used when shifting any of the range gears.

In the embodiment as shown in FIG. 5, the torque fill drive system 16''' is operative to transfer drive to the output shaft of the range gearbox through part of a ground speed PTO driveline, indicated generally at 80. The majority of the transmission in this embodiment is the same as that of the first embodiment and so will not be described in detail. The same reference numerals are used to denote features which are the same as in the previous embodiments or which perform the same function.

The ground speed PTO driveline 80 includes a first ground speed PTO gear 82 rotationally mounted about the range gearbox output shaft 28 and a ground speed PTO clutch 84. The ground speed PTO clutch is operative to couple the first ground speed PTO gear 82 for rotation with the range gearbox output shaft 28 when engaged. The first ground speed PTO gear 82 is drivingly coupled with a further ground speed gear 86 fixed rotationally fast at one end of a ground speed PTO transmission shaft 88 through one or more further gears 90. Accordingly, when the ground speed PTO clutch 84 is engaged, torque can be transmitted between the range gearbox output shaft 28 and the ground speed PTO transmission shaft 88. Other arrangements for transmitting drive between the ground speed PTO transmission shaft 88 and the range gearbox output shaft 28 can be adopted. The ground speed PTO clutch may be a dog clutch or any other suitable type of clutch.

The other end 92 of the ground speed PTO transmission shaft 68 is drivingly coupled to a PTO output shaft (not shown). This arrangement is not shown in detail as it is not relevant to the present invention. However, as is known in the art, both the independent PTO transmission shaft 25 and the ground speed PTO transmission shaft 88 may be drivingly coupled to a common PTO output shaft through a suitable arrangement of gears, at least some of which may be selectable. The arrangement is configured such that the PTO output shaft is driven at a set speed if the independent PTO clutch 24 is engaged or at a ground speed if the ground speed PTO clutch 84 is engaged. In some cases, a suitable gear must also be selected to transmit drive to the PTO output shaft. For example, the independent PTO drivetrain may include selectable gears which provide different ratios between the independent PTO transmission shaft 25 and the PTO output shaft so that the PTO output shaft can be selectively driven at more than one fixed speed, e.g. 1000 rpm, 540 rpm, and economy mode. However, if no gear is selected then no drive will be forwarded to the PTO output shaft even if the independent PTO clutch 24 is engaged.

The torque fill drive system 16''' includes a drive arrangement for transmitting drive from the auxiliary drive shaft 14 to the ground speed PTO transmission shaft. In this embodiment, the drive arrangement is operative to transmit drive from the an output or downstream side 24a of the independent PTO clutch 24 to the ground speed PTO transmission shaft 88 so that torque will only be transmitted when the independent PTO clutch 24 is engaged. However, in an alternative embodiment, the torque fill drive arrangement may be coupled to the auxiliary drive shaft 14 upstream of the independent PTO clutch 24 so that operation of the torque fill system 16''' does not require actuation of the independent PTO clutch 24.

The output part 24a of the independent PTO clutch is drivingly coupled with a gear 94 rotatably mounted about the ground speed PTO transmission shaft 88 by a gear train, indicated generally at 96, which in this case comprises a series of meshing gears indicated schematically at 98 and 100. A torque fill clutch 74''' is operative to drivingly couple the gear 94 to the ground speed transmission shaft 88 when engaged. Thus when the independent PTO clutch 24 and the torque fill clutch 74''' are engaged, torque can be transmitted from the auxiliary drive shaft 14 to the ground speed PTO transmission shaft 88. If the ground speed PTO clutch 84 is also engaged, torque will be transmitted from the ground speed PTO transmission shaft 88 to the range gearbox output shaft 28.

As discussed above, the respective drive lines between the independent PTO transmission shaft 25 and the ground speed transmission shaft 88 to the PTO output shaft may each include gears that can be selected and de-selected such that if no gears in the relevant drive line are selected, the independent PTO clutch 24 and the ground speed PTO clutch 84 can be engaged without necessarily transmitting drive to the PTO output shaft.

In normal use when the vehicle is travelling, at least the torque fill clutch 74''' is disengaged and drive to the wheels is transmitted through the range gearbox from the input shaft 26 to the output shaft 28 in the usual way. When a change of the input or output stage range gear 34, 36, 40, 42 is required, drive to the input shaft 26 of the range gearbox is interrupted, for example by disengaging the main clutch 32. However, drive to the auxiliary drive shaft 14 is maintained and by engaging the independent PTO clutch 24, the torque fill clutch 74''', and the ground speed PTO clutch 84, drive is transmitted from the auxiliary drive shaft 14 to the output shaft 28 of the range gearbox and hence to the driving wheels to maintain the momentum of the vehicle. Once the gear change has been completed, the main clutch 32 is re-engaged and at least the torque fill clutch 74''' disengaged. Use of the torque fill system 16''' to temporality provide a driving torque to the road wheels while drive to the input shaft of the range gear box is interrupted (torque filling) reduces the effect of torque interruption to the driving wheels during the shifting procedure, providing a smoother driving experience.

Since the torque fill drive system 16''' has a fixed gear ratio, it can only be used when the vehicle is travelling forwardly and the torque fill drive system gear train is configured so that drive is transmitted to the output shaft of the range gearbox in an appropriate rotary direction. The torque fill drive system 16''' gear ratio is selected to provide a smooth transition between the top of one range and the bottom of the next.

During normal driving of the vehicle, one or other of the independent PTO clutch 24 and the ground speed PTO clutch 84 may be engaged if that PTO is in use. However, provided the torque fill clutch 74''' remains disengaged, use of the PTO will not be affected. Depending on the arrangement of the PTO drivetrains, it may be possible to actuate the torque fill system when the independent PTO is in use, provided drive from the ground speed PTO transmission shaft 88 to the PTO output shaft is disconnected. However, it is not expected that the torque fill system would be used while the ground speed PTO is in use. Generally speaking though, it is expected that drive from the independent PTO clutch 24 and the ground speed PTO transmission shaft 88 to the PTO output shaft will be disconnected, say by not selecting certain gears in the PTO drivetrain, while the torque fill system is in use.

Actuation of the main clutch 32 may be synchronized simultaneously or sequentially with actuation of the independent PTO, torque fill, and ground speed PTO clutches 24, 74''', 84 and/or actuation of the various clutches may overlap. If actuation is sequential, drive to the range gear input shaft is interrupted just prior to or just after the independent PTO, torque fill, and ground speed PTO clutches are engaged and these clutches disengaged just before or just after drive to the input shaft is reinstated.

It is expected the toque fill system will include an electronic control system for controlling actuation of the torque fill clutch 74, 74', 74'', 74''' and, at least in respect of the embodiment shown in FIG. 5, the independent PTO and ground speed PTO clutches 24, 84. Accordingly, each of these clutches may comprise an actuation system controllable by an electronic control system and may comprise an electronic and/or fluid actuator. The electronic control system may comprise an ECU programmed to actuate the torque fill system and torque fill clutch as required, dependent on operating conditions of the vehicle. The control system may include various sensors to provide inputs indicative of the operating conditions of the vehicle. These may include sensors to indicate that a change of range gear has been requested or is required for example.

The control system may also control actuation of the main clutch and co-ordinate engagement and disengagement of the torque fill clutch 74, 74', 74'', 74''' with that of the main clutch. The ECU may be a vehicle ECU or it may be a separate, dedicated ECU which is in communication with a vehicle ECU, say by means of a CAN BUS interface. The various clutches can be of any suitable type.

For clarity reasons, the vehicle transmission as illustrated in FIGS. 2 to 5 have been simplified to show only those details relevant to the present invention. An actual vehicle transmission incorporating a range gearbox 12 and torque fill drive system 16, 16', 16'', 16''' as illustrated will usually include a number of additional features or systems such as one or more PTO gear trains and/or a crawler mode gear train, as well as various clutches and/or differentials for transmitting drive from the output shaft of the range gearbox to the rear and/or front wheels of the vehicle. For example, the embodiments shown in FIGS. 2 to 4 may include a ground speed PTO arrangement similar to that shown in FIG. 5.

The skilled person will understand that the shafts and gears in the aforementioned description and examples are of any suitable material and type and will include various periphery items such as supporting bearings and fasteners in order to make the transmission arrangement 10 operable.

The invention is not limited to the embodiments or examples described herein, and may be modified or adapted without departing from the scope of the present invention. For example, the number of selectable input stage gears and/or output stage gears in the range gearbox may be varied. Thus the range gearbox could include three or more selectable input stage gears and/or three or more selectable output stage gears as an example. Indeed, at least in respect of the embodiment illustrated in FIG. 5, the invention is not limited to use in a transmission having a range gearbox comprising parallel input, output and lay shafts.

The invention claimed is:

1. A transmission arrangement for an agricultural vehicle comprising:
   a range gearbox comprising:
   an input shaft driveably connectable to a prime mover of the agricultural vehicle in which a transmission is mounted;
   an output shaft driveably connected to the input shaft to provide a number of drive ratios,
   a plurality of input stage gears rotatably mounted to the input shaft and a first gear selection arrangement for selectively locking any one of the input stage gears to the input shaft to transmit drive between the input shaft and the selected input stage gear;
   a plurality of output stage gears rotatably mounted to the output shaft and a second gear selection arrangement for selectively locking any one of the output stage gears to the output shaft to transmit drive between the selected output stage gear and the output shaft; and a lay shaft having a plurality of gears for transferring torque between the input and output stage gears;

wherein the range gearbox provides drive to at least one ground engaging member of the vehicle;

an auxiliary drive shaft driveably connectable to the prime mover independently of the range gearbox input shaft; and a torque fill drive system operative between the auxiliary drive shaft and the range gearbox output shaft, the torque fill drive system comprising:

a torque fill clutch configured, to transmit torque from the auxiliary drive shaft to the output shaft of the range gearbox when the torque fill clutch is engaged;

wherein the torque fill drive system is configured to transmit torque to the range gearbox output shaft through the range gearbox lay shaft.

2. The transmission arrangement of claim 1, wherein the input, output and lay shafts in the range gearbox are aligned parallel to one another and wherein the torque fill drive system comprises:

a torque fill drive shaft aligned parallel to the range gearbox shafts; and a torque fill shaft input drive arrangement for transmitting drive from the auxiliary shaft to the torque fill shaft and a torque fill shaft output drive arrangement for transmitting drive from the torque fill shaft to the range gearbox lay shaft, the torque fill clutch forming part of the torque fill shaft input drive arrangement or the torque fill drive output arrangement.

3. The transmission arrangement of claim 2, wherein the range gearbox input shaft is hollow and the auxiliary drive shaft passes through the range gear input shaft, the auxiliary drive shaft exiting the range gearbox input shaft at a first side of the range gearbox, the torque fill shaft input drive arrangement being located at the first side of the range gearbox for cooperation with the auxiliary drive shaft.

4. The transmission arrangement of claim 3, wherein the torque fill shaft output drive arrangement is located at a side of the input stage gears opposite the torque fill shaft input drive arrangement.

5. The transmission arrangement of claim 4, wherein the torque fill shaft output drive arrangement comprises a series of meshing gears including at least a first gear mounted about the torque fill drive shaft and a second gear fixed for rotation with the lay shaft, the torque fill clutch operative to selectively couple and decouple the first gear and the torque fill drive shaft.

6. The transmission arrangement of claim 3, wherein the torque fill clutch forms part of the torque fill shaft input drive arrangement.

7. The transmission arrangement of claim 6, wherein the torque fill shaft input drive arrangement comprises a series of meshing gears including at least a first gear fixed for rotation with the auxiliary shaft and a further gear, wherein the torque fill clutch is operative to selectively couple and decouple the further gear and the torque fill drive shaft.

8. The transmission arrangement of claim 6, wherein the torque fill shaft output drive arrangement comprises a gear fixed for rotation with the torque fill drive shaft, the gear being in constant meshing engagement with one of the input stage gears of the range gearbox, and wherein the one of the input stage gears is in constant meshing engagement with a gear fixed for rotation with the range gearbox lay shaft.

9. The transmission arrangement of claim 1, wherein the torque fill drive system comprises a series of meshing gears, wherein a first of the meshing gears is fixed for rotation with the auxiliary drive shaft, and the torque fill clutch is operative to selectively couple and decouple a final gear in the series and the range gearbox lay shaft.

10. The transmission arrangement of claim 1, wherein the transmission further comprises at least one device selected from the group consisting of a PS transmission and a shuttle gearbox upstream of the range gearbox.

11. An agricultural vehicle comprising the transmission arrangement of claim 1.

12. The agricultural vehicle of claim 11, wherein the prime mover is operably connected to the range gear input shaft and the auxiliary drive shaft.

13. A method of operating the agricultural vehicle of claim 11, the method comprising engaging the torque fill clutch to transfer torque from the auxiliary shaft to the range gearbox output shaft during a change in range gear.

14. The method of claim 13, further comprising disengaging the torque fill clutch once the gear change is complete.

15. A method of operating an agricultural vehicle, comprising the transmission arrangement of claim 1, the method comprising engaging the torque fill clutch to transfer torque from the auxiliary shaft to the range gearbox output shaft during a change of the input stage range gear.

16. A transmission arrangement for an agricultural vehicle comprising:

a range gearbox comprising:

an input shaft driveably connectable to a prime mover of the agricultural vehicle in which a transmission is mounted;

an output shaft driveably connected to the input shaft to provide a number of drive ratios, wherein the range gearbox provides drive to at least one ground engaging member of the vehicle;

an auxiliary drive shaft driveably connectable to the prime mover independently of the range gearbox input shaft; and a torque fill drive system operative between the auxiliary drive shaft and the range gearbox output shaft, the torque fill drive system comprising:

a torque fill clutch configured, to transmit torque from the auxiliary drive shaft to the output shaft of the range gearbox when the torque fill clutch is engaged;

wherein the transmission comprises a ground speed PTO transmission shaft which is drivingly engageable with the range gearbox output shaft by a ground speed PTO clutch, and the torque fill drive system is operative to transmit torque from the auxiliary shaft to the range gearbox output shaft through the ground speed PTO transmission shaft and the ground speed PTO clutch.

17. The transmission arrangement of claim 16, wherein the torque fill system comprises a gear train for transmitting drive between the auxiliary drive shaft and the ground speed PTO transmission shaft, and the torque fill clutch is operative to drivingly couple and decouple a final gear of the gear train with the ground speed PTO transmission shaft.

18. The transmission arrangement of claim 17, wherein the torque fill drive system comprises a further clutch operative to drivingly couple a first gear in the gear train to the auxiliary drive shaft.

* * * * *